Feb. 16, 1932.    J. F. SEELBACH    1,845,631
SASH PULLEY
Filed June 3, 1929
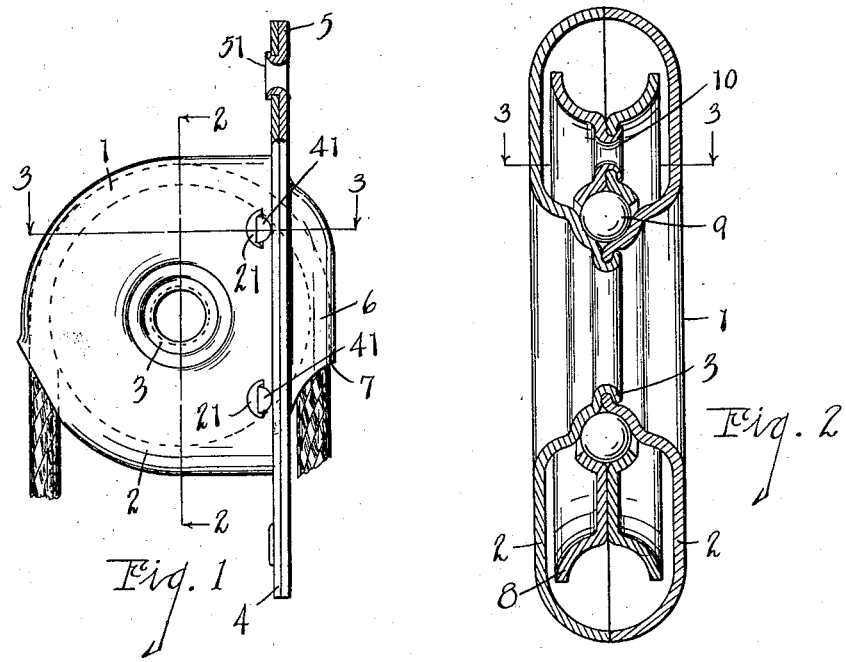
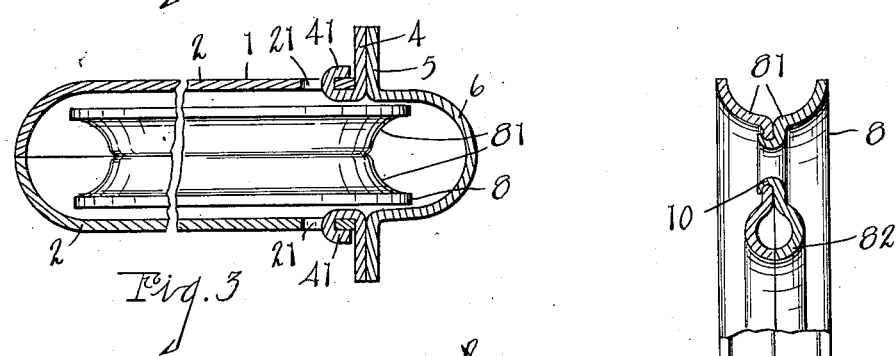
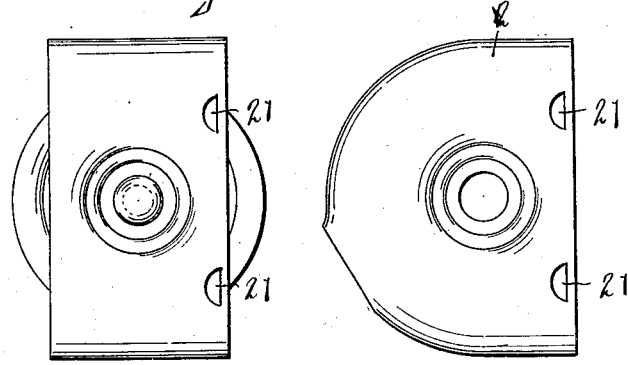
INVENTOR
John F. Seelbach
BY
ATTORNEYS Patented Feb. 16, 1932

1,845,631

UNITED STATES PATENT OFFICE

JOHN F. SEELBACH, OF GRAND RAPIDS, MICHIGAN, ASSIGNOR TO GRAND RAPIDS HARDWARE CO., OF GRAND RAPIDS, MICHIGAN

SASH PULLEY

Application filed June 3, 1929. Serial No. 367,860.

This invention relates to improvements in sash pulleys made of metal stampings.

The objects of the invention are:

First, to provide an improved casing for such a sash pulley.

Second, to provide such a casing with an improved guide for the cord.

Third, to provide such a structure which lends itself very readily to either ball or plain bearings.

Objects pertaining to details and economies of construction and operation will definitely appear from the description to follow. Preferred embodiments of my invention are illustrated in the accompanying drawings, in which:

Fig. 1 is a side elevation view of my improved sash pulley, the upper part of the face plate being in section to show the method of construction, and the ends of the cord being cut away.

Fig. 2 is an enlarged detail vertical sectional view on line 2—2 of Fig. 1 through the center of the casing and the pulley wheel, showing details of construction of the ball bearing sash pulley.

Fig. 3 is an enlarged detail transverse sectional view on line 3—3 of Figs. 1 and 2, showing details of construction of the face plate and guide and the method of attaching the same to the body of the pulley case.

Fig. 4 is a detail side elevation view of the pulley case detached.

Fig. 5 is a modified form of the same, in which the back or inner side is left open, and a usual bearing pin is provided.

Fig. 6 is an enlarged detail of the pulley wheel adapted to a plain bearing, a part being broken away to show details of construction.

The parts will be identified by their numerals of reference which are the same in all the views.

The pulley casing 1 is made up of a pair of side pieces 2, 2, identical in form, which are joined together by a spun joint 3, see Fig. 2. A front flange plate 4 is secured in place by attaching lugs 41 engaging through apertures 21 in the side members 2. A cover plate 5, corresponding to the face plate 4, is secured in place by especial upset eyelet structure 51 riveting the parts together and forming the screw hole for attachment. The cover plate 5 is provided with a guide 6 struck-up and formed integrally therewith, with a tangential opening 7 at the under side. The struck-up portion 6 is preferably slightly more than the thickness of the sash cord so that the sash cord is guided straight down in front of the cover plate 5.

The pulley wheel 8 is made up of identical side members 81, 81 suitably conformed to make a groove for the pulley on the outside and form a groove for the balls 9 of the ball bearing within. The sides of the casing are similarly conformed.

These parts are riveted together by struck-up metal from one half engaging apertures on the other somewhat in the form of an eyelet 10. This is a usual method of connecting sheets of metal together. Where it is desired to make a plain bearing the halves 81 are extended internally into annular ring-like projections 82, the two halves exactly conforming to fit the bearing surface provided for the balls, and proving a very effective structure where a plain bearing is desired, or required.

An inspection will show that the flange 4 and the cover flange 5 might be made integral and be provided with lugs comparable to the lugs 41 for attaching the same. However, it is preferred to provide a separate flange from the cover flange because in that way a comparatively heavy flange can be produced from light metal which is easy to work, whereas, if a single flange was provided, it would be quite desirable to make it much heavier than would be required for the guide 6. It is, therefore, preferred to make the structure of two pieces of metal.

The sides of the pulley case can be made in the form indicated in Fig. 5, which is a little more readily formed than the preferred form and is provided with a bearing pin. By making it of the right width, the cord will pass down without obstruction although not so completely guided as in the preferred construction. The flange plate and cover plate or the cover plate alone may be attached, such cover having the tangential opening.

It will be seen from this description that this structure is capable of quite considerable modification without departing from my invention. I am aware that structures of the fin form have been heretofore produced. I am making a special form which is economical to produce and very strong, requiring but a minimum of metal, and, at the same time, the sash cord is completely and fully guided and protected from injury to the maximum extent.

Having thus described my invention, what I claim as new and desire to secure by Letters Patent, is:

A sash pulley construction of metal stampings, comprising a casing made up of opposed symmetrical halves retained together at the central point by rivet portion and conformed centrally as a bearing for the pulley wheel, one side of the said casing being left open and plane, and the other side being provided with a tangential aperture for the cord, a face flange plate secured to the said pulley case by suitable lugs inserted in apertures through the sides thereof, and a cover plate with a flange corresponding to the face flange and having struck-up cord guide guard and portion with tangential opening at the bottom.

In witness whereof I have hereunto set my hand.

JOHN F. SEELBACH.